Nov. 1, 1960　　　　H. MUNGAARD　　　　2,958,811
ELECTRIC CIRCUIT WITH A RESISTANCE MEMBER
SENSITIVE TO LIGHT OR HEAT
Filed Oct. 22, 1957
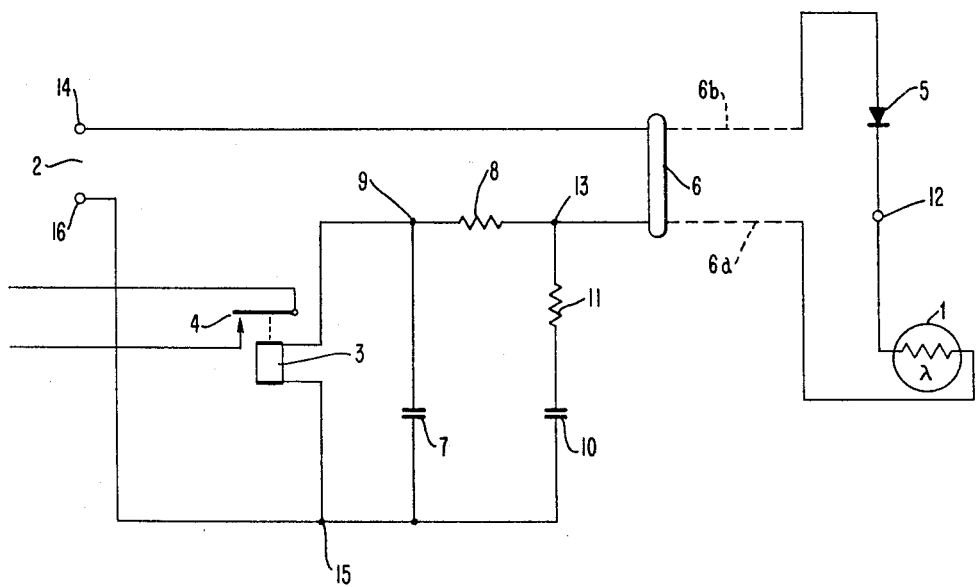

United States Patent Office 2,958,811
Patented Nov. 1, 1960

2,958,811

ELECTRIC CIRCUIT WITH A RESISTANCE MEMBER SENSITIVE TO LIGHT OR HEAT

Hans Mungaard, Langeso, Nordborg, Denmark, assignor to Danfoss ved ingenior Mads Clausen, Nordborg, Denmark, a Danish firm Filed Oct. 22, 1957, Ser. No. 691,597

Claims priority, application Denmark Oct. 27, 1956

3 Claims. (Cl. 317—124)

The invention relates to an electric circuit with a resistance member sensitive to light or heat such as a photoresistance regulating the current from a source supplying alternating current to an electric relay the contacts of which are controlled in accordance with the action of light or heat on the photoresistance.

Electric circuits of the aforesaid kind are known, being used, for example, for cutting in and cutting out the fuel controls of an oil burner, but the known circuits are relatively complicated since they incorporate power transformers and electric amplifiers which may often act as sources of error and reduce the dependability of the circuit; furthermore, the effect of the known circuits is generally dependent on the voltage variations of the voltage generator.

It is the object of the invention to devise an electric circuit having none of the aforesaid drawbacks and an essential feature of the circuit according to the invention is that a rectifier is inserted in series with the relay, the latter being connected in parallel with a condenser having a low impedance in relation to the impedance of the relay at the frequency produced by the source of alternating current supply.

The result obtained is a very simple construction of the electric circuit since the circuit does not incorporate any power transformer or electron tube amplifier, whereby the reliability of the electric circuit is highly increased. A further result obtained is that in case of any short-circuiting of the rectifier, for instance, short-circuiting of a feeder cable for the said device, the electric relay will be tripped, if it is attracted, and not be capable of attracting if it is tripped, which ensures that the relay will trip in case such a short-circuit arises, the circuit normally operating as a circuit of direct current in which the condenser constitutes a smoothing-out link for the direct current flowing through the relay, whereas the circuit at the said short-circuit acts as a circuit of alternating current in which the condenser constitutes an effective shunt for the electric relay which owing to its relatively high impedance and owing to the low impedance of the condenser for alternating current receives an insufficient supply of current to remain attracted or to attract.

In an embodiment of the electric circuit according to the invention the rectifier and the photoresistance are directly connected with each other at a common point and mounted directly near each other, the outer terminals of the said parts being connected to a feeder cable the first conductor of which is connected to the one outer terminal of the relay, the other conductor being connected to one pole of the voltage generator whereas the other terminal of the relay is connected to the other pole of the voltage generator.

The result obtained is such a compact tie of the rectifier and the photoresistance that in case of any short-circuiting both the rectifier and the photoresistance will be short-circuited.

In a preferred embodiment of the circuit according to the invention the rectifier consists of a silicium diode and the photoresistance is constituted by a heat-resistant semiconductor sensitive to the action of heat or light.

As a result the rectifier and the photoresistance require less space than is necessary in the known circuits and furthermore the said two devices owing to their physical properties may be exposed to substantially higher temperatures than the light or heat-resistant resistance devices used in the known circuits of the aforesaid kind. The photoresistance proper may owing to its physical dimensions be mounted at places where there will be wholly insufficient space for mounting for example the photocells ordinarily used. As a further result the electric circuit has a low impedance and therefore becomes considerably more independent of the capacity and the insulation of the feeder cable, which means that the cable lengths permissible are substantially greater than in the known circuits. Since the circuit according to the invention does not incorporate any electron tubes, no operational troubles owing to burning out of such electron tubes or the reduced electron emission, are liable to arise, and both rectifiers and photoresistances of the said types have been found by experience to possess a life substantially in excess of that of photocells and electron tubes.

In an embodiment of the electric circuit according to the invention a series-resistance is inserted in series with the first conductor of the cable between the conductor and the first outer terminal of the relay.

The result obtained is that the series-resistance acts as a potentiometer for the relay, so that the alternating voltage across the relay in case of the aforesaid short-circuiting is reduced very substantially owing to the low impedance of the condenser in relation to the relay impedance.

In a third embodiment of the electric circuit according to the invention there is provided, parallel to the condenser and the series-resistance, another condenser and a damping resistance connected in series with the last mentioned condenser.

As a result, the flow of rectified direct current is further smoothed out, whereby the attractive force of the relay is increased under normal operation, but in addition the relay does not attract, not even for brief intervals, if the feeder cable is short-circuited at a time when the photoresistance is non-illuminated and when the immediate value of the alternating voltage across the other condenser has a maximum that may be positive or negative, whereby discharging of this other condenser may involve a rush of current which, however, is damped by the damping resistance so that no relay rebound occurs that might cause the relay to attract and give a false signal. If any short circuiting is suddenly removed, for example by the defect being remedied, both the first and the second condenser will shunt the relay so that there will be no relay rebound in this case either, and the circuit will thus, since it contains no safety fuse, be ready for renewed operation at the moment such short-circuiting in the cable is removed. The relay will thus release, not only at a direct short-circuiting of the feeder cable, but also if the said cable should get a very low insulation resistance and furthermore if the direct current conductor should be short-circuited with any other alternating current conductor whatever, for example in the same cable, the voltage of which is equal to or greater than the voltage of the alternating current source. A short-circuiting between two alternating current conductors in the said cable will, on the contrary, have no influence on the function of the circuit.

The invention will now be further described with reference to the drawing which shows an electric circuit according to the invention.

In the drawing, 1 denotes a resistance sensitive to light and heat, such as a photoresistance connected in series with a source 2 of alternating current and an electric relay 3 the contacts 4 of which may be inserted in a circuit (not shown) having arbitrary electrical functions and consisting, for instance, of electric safety circuits working in connection with oil burners which are controlled in accordance with the light or heat acting upon the photoresistance 1. In series with the relay 3 there is inserted a rectifier 5 across a feeder cable 6 and in parallel with the relay 3 is connected a condenser 7 which has a low impedance in relation to the impedance of the relay 3 at the frequency produced by the source 2 of alternating current, the said frequency being normally of the order of 50 cycles per second. The impedance of the relay 3 and the design of this relay are so selected that it is relatively insensitive to alternating currents of frequencies of the said order and to higher frequencies. In view of the high temperatures of the surroundings, such as 100° C. to which the rectifier 5 and the photoresistance 1 may be exposed at certain uses, the rectifier 5 according to the invention may be a silicium diode and the photoresistance 1 a heat-resistant semi-conductor sensitive to light or heat such as a single crystal of cadmium sulphide. When the photoresistance 1 is subjected to the action of light or heat, its resistance value will, for example, decline from the order of $10^6$ to $10^7$ ohms, at the beginning rather abruptly and then uniformly, to an order of $10^2$–$10^3$ ohms, and the current from the source 2 of current through the photoresistance 1 and the relay 3 will increase correspondingly. The current is rectified by the rectifier 5 and the condenser 7 acts as a link smoothing out the flow of direct current produced thereby. To further smooth out the flow of direct current one embodiment of the electric circuit according to the invention has a photoresistance 8 inserted in series with the one conductor 6a of the cable between the conductor 6a and one outer terminal 9 of the relay, and furthermore, in a preferred embodiment of the circuit according to the invention there is provided in parallel across the condenser 7 and the series-resistance 8 another condenser 10 and a damping resistance 11 connected in series with the said condenser 10, as a result of which a part of the alternating current energy in the positive half period of the alternating voltage is stored in the other condenser 10 and is discharged again to the relay 3 in the subsequent negative half period.

The operation of the circuit is as follows:

Under normal operation the circuit acts as a direct current circuit and the strength of the smoothed-out current through the relay 3 depends on the action of light or heat on the photoresistance 1 which in its non-illuminated condition has a high resistance and in its illuminated condition has a low resistance, in which last-mentioned case the circuit, apart from the relay 3, thus has a low impedance and in consequence is rather independent of the self capacity of the feeder cable 6 and the insulation resistance, that is, the feeder cable 6 may be of rather considerable length which is only determined by the series resistance of the cable, which is substantially more favourable than with the use of e.g. photocells, the relatively high internal resistance requires a feeder cable with low self capacity and high insulation resistance.

In case of a defect in the feeder cable 6, for example when one or both conductors of the cable are cut off, in case of substantially reduced insulating resistance between the conductors or by direct short-circuiting of these, the rectifier 5 and the photoresistance 1 are put out of function, and this causes immediate tripping of the relay 3, if it is cut in, or that the relay cannot attract, if tripped. To ensure that the photoresistance is not in case of any short-circuiting put out of function without the rectifier being put out of function simultaneously, both of the said devices are in a convenient manner according to the invention directly connected with each other, that is, without any intermediary conductor, at a common point 12 and mounted directly near each other, the first conductor 6a of the cable being connected to the first outer terminal 9 of the relay 3 or to the one terminal 13 of the series-resistance connected to the said outer terminal, and the second conductor 6b of the cable is connected to the one pole 14 of the voltage generator 2, whereas the other outer terminal 15 of the relay is connected to the other pole 16 of the voltage generator. The smoothing-out link consisting of the condenser 7 and the series-resistance 8 acts in case of short-circuiting of the cable 6 as a potentiometer for the relay 3 and ensures that the alternating voltage across the relay is reduced to such a low value that the relay rapidly trips at the short-circuiting and is unable to attract if the relay, when short-circuiting occurs, has been tripped. This effect of the smoothing-out link is increased by the parallel circuit for the relay 3 and the series-resistance 8, which parallel circuit consists of the other condenser 10 and the damping resistance 11, but the parallel circuit has furthermore the effect that the relay does not emit a false signal attracting for a brief interval if the photoresistance 1 is in a non-illuminated state, and a short-circuit, if any, is removed at a time at which the immediate value of the alternating voltage across the other condenser 10 has a maximum, positive or negative, the energy accumulated in the other condenser 10 being in that case necessarily discharged through the damping resistance 11, the series-resistance 8 and the relay 3. By selecting suitable constants for the damping resistance 11 and for the other condenser 10 it is possible to damp the exponential discharge current from the other condenser 10 so much that its peak value does not act upon the relay 3, whereby a relay rebound which might involve a false signal across the contact 4 is prevented.

It will be appreciated that even though the circuit according to the invention as mentioned in the foregoing is primarily applicable e.g. as flame control in an oil burner the invention may be used in remote control devices operating over relatively large distances, for example for cutting in street lighting, illumination of shop windows and in electric signboards for control of these at the transition from illuminated to non-illuminated state. The circuit may furthermore be used for automatic door-opening, for controlling coupling and counting devices in punched card machines and other electric calculating machines, for controlling conveyors and packing machines, in protective devices for machine tools, more particularly punching machines and for controlling electromotors by means of light and on the whole for remote control of burglar alarm installations and other electric installations, for example by means of ultra-violet or infrared rays or X-rays, in fact, wherever reliability and in particular safety in case of short-circuiting is a primary consideration.

What I claim and desire to secure by Letters Patent is:

1. A relay circuit arrangement operated by radiant energy comprising, in combination, a source of alternating current, a relay having a direct current operating coil connected in series with said source, a load circuit operably connected to said relay and operably opened and closed thereby, a rectifier in series with said source connected to apply direct current to said operating coil, a sensing element in series between said operating coil and said rectifier for sensing heat and light radiant energy and having an electrical resistance variable as a function of the radiant energy received thereby, means connecting said sensing element and said rectifier in series substantially immediately adjacent one another, and a capacitor in parallel with said operating coil for smoothing out direct current applied to the coil and for shunting alternating current around the operating coil thereby to deenergize it and maintain it deenergized during shorting out of the sensing element and the rectifier.

2. A relay circuit arrangement operated by radiant energy comprising, in combination, a source of alternating current, a relay having a direct current operating coil connected in series with said source, a load operating circuit operably connected to said relay and operably opened and closed thereby, a rectifier in series with said source connected to apply direct current to said operating coil, a sensing element in series between said operating coil and said rectifier for sensing heat and light radiant energy and having an electrical resistance variable as a function of the radiant energy received thereby, means connecting said sensing element and said rectifier in series substantially immediately adjacent one another, a capacitor in parallel with said operating coil for smoothing out direct current applied to the coil and for shunting alternating current around the operating coil thereby to deenergize it and maintain it deenergized during any shorting out of the sensing element and the rectifier, an impedance element in series between the sensing element and said operating coil, and the capacitor having a substantially lower impedance than the combined impedance of said operating coil and the impedance element at the operating frequency of said alternating current source.

3. A relay arrangement according to claim 2, further including a damping impedance element and another capacitor in series therewith connected in parallel with the first-mentioned capacitor for controlling the peak value of discharge current from said first-mentioned capacitor and impedance element in series and maintain it at a value ineffective for operating said relay.

References Cited in the file of this patent

UNITED STATES PATENTS

| | | |
|---|---|---|
| 2,048,269 | Koch | July 21, 1936 |
| 2,148,482 | Lorenz | Feb. 28, 1939 |
| 2,440,108 | Maxwell | Apr. 20, 1948 |
| 2,773,219 | Aron | Feb. 4, 1956 |